Patented Aug. 6, 1946

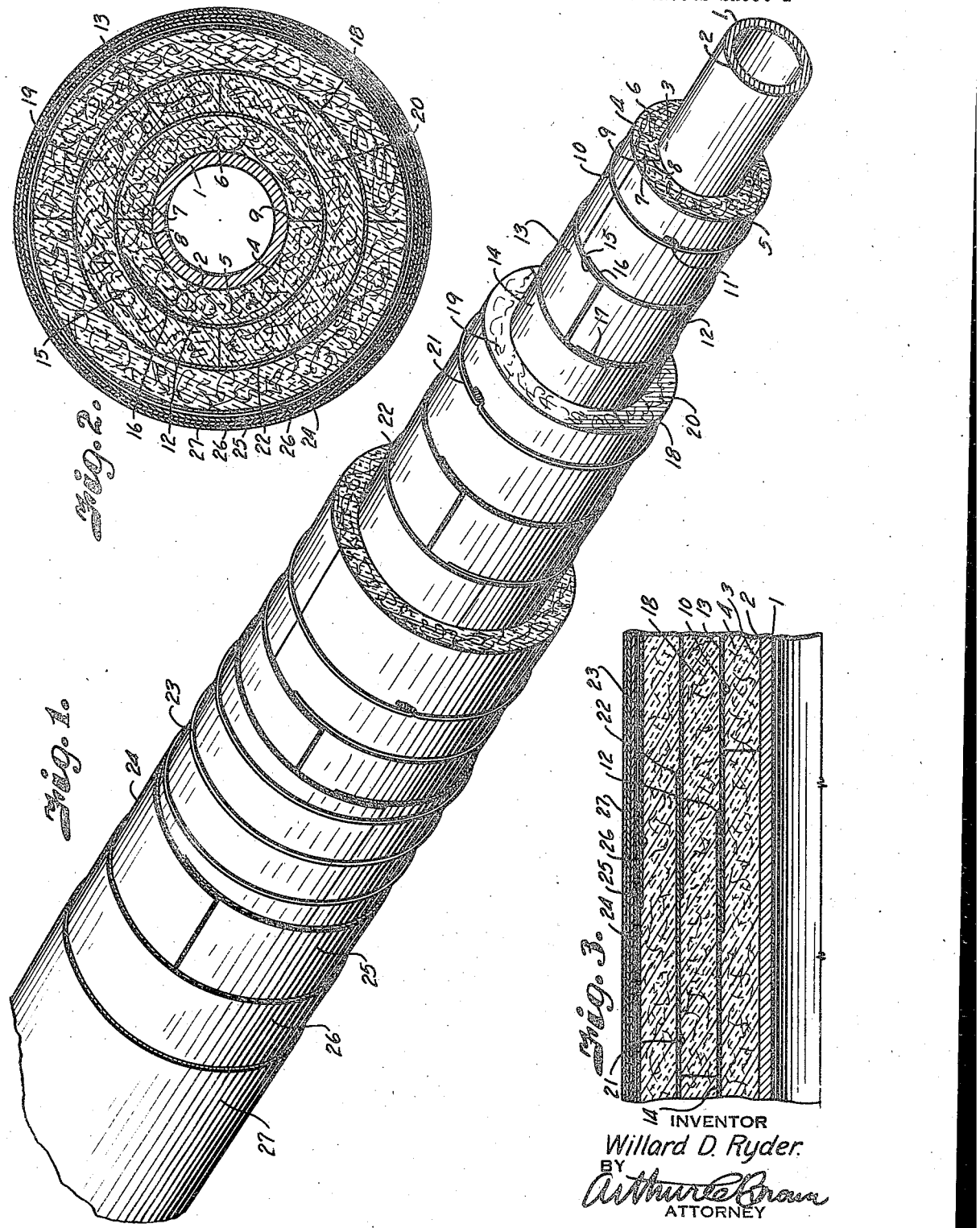

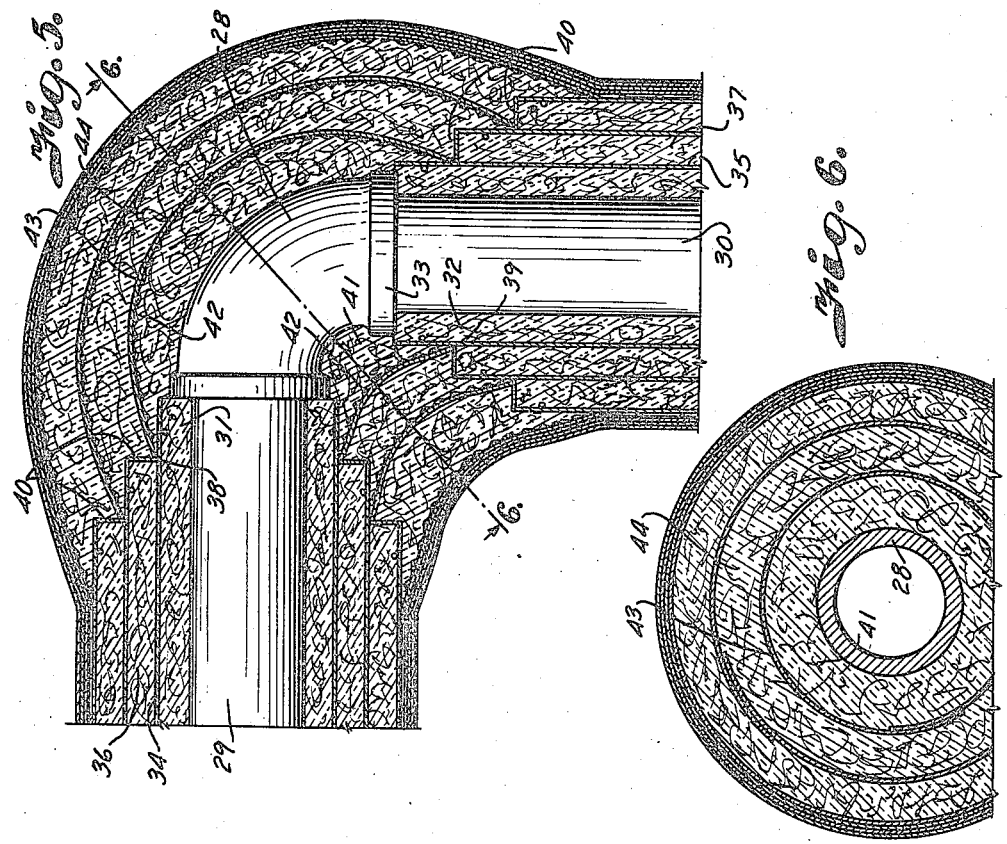
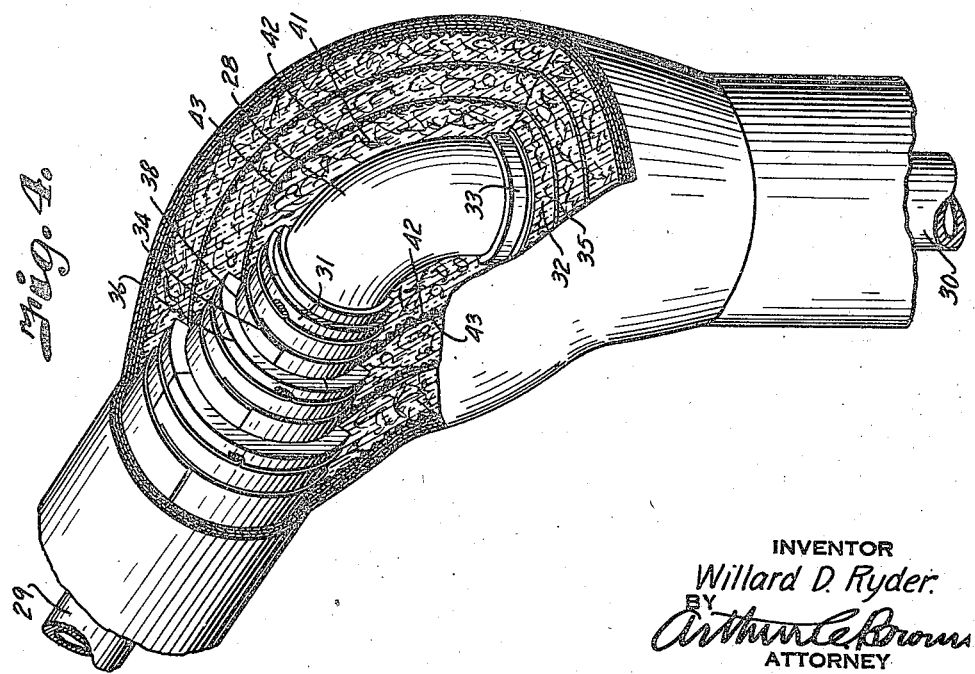

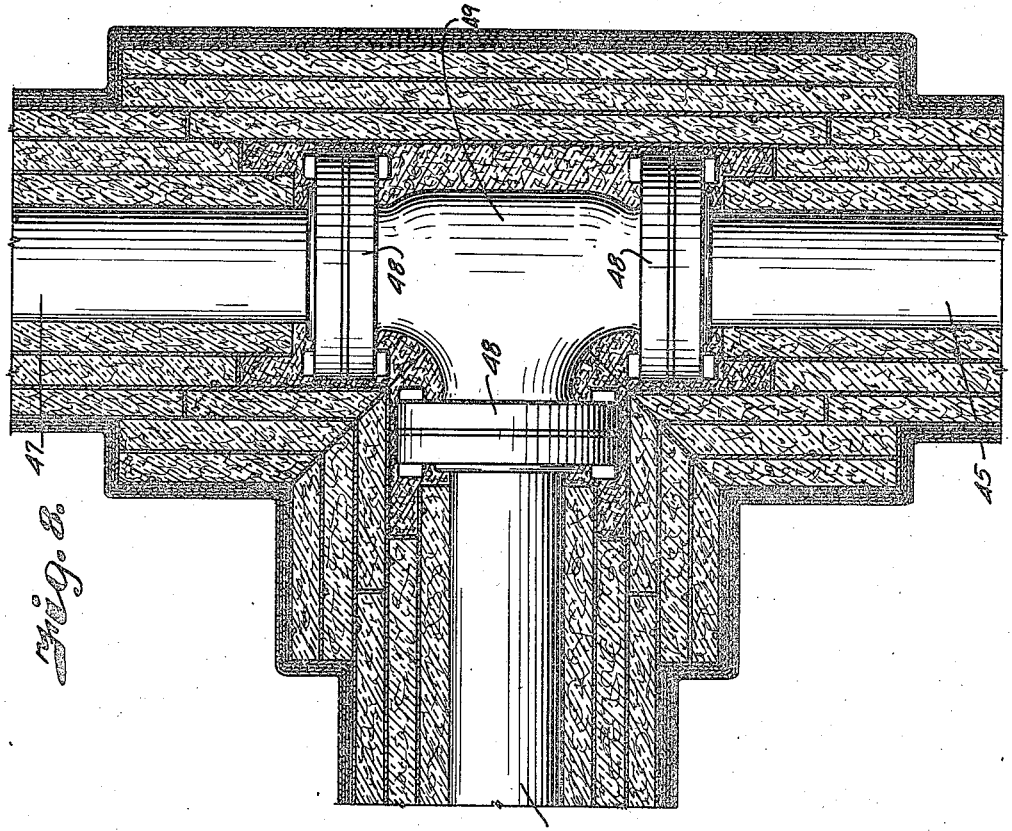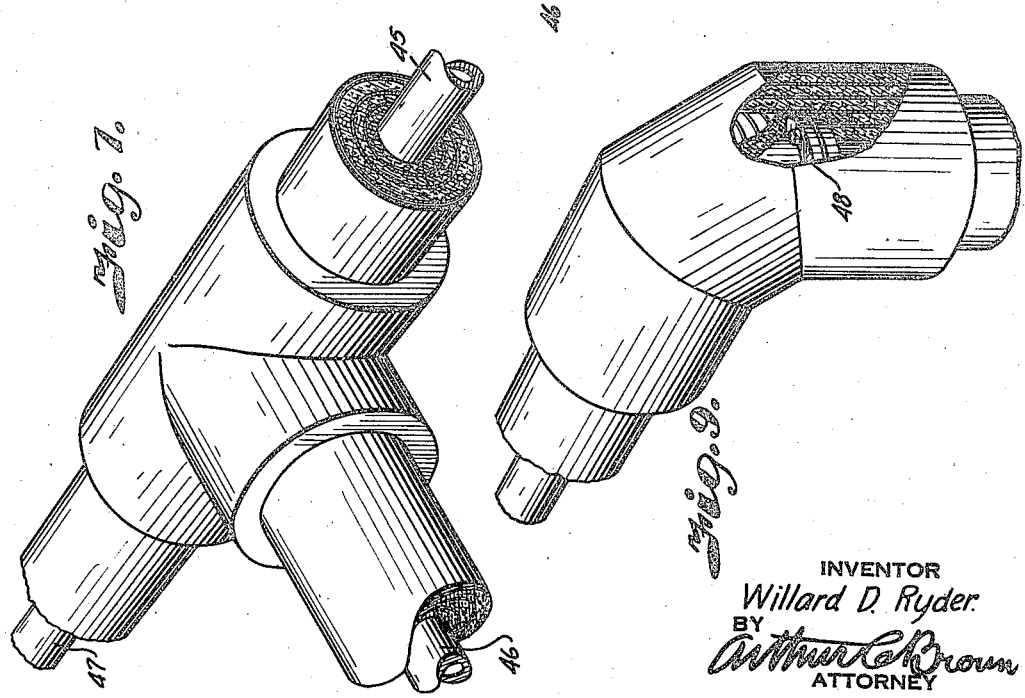

2,405,330

UNITED STATES PATENT OFFICE 2,405,330

INSULATING STRUCTURE

Willard D. Ryder, Tulsa, Okla.

Application April 12, 1941, Serial No. 388,325

5 Claims. (Cl. 154—44)

This invention relates to an insulating construction for holding temperatures varying from atmospheric to as low as a calculated absolute zero fahrenheit, and has for its principal object to provide an efficient, relatively simple and moisture-proof structure sealed against the infiltration of normal precipitated or attracted moisture and air.

Other objects of the invention are to provide an insulation including a plurality of layers of preformed fibrous sections; to provide impervious seals between the layers and/or the area insulated for sealing the cellular structure thereof; and to provide a construction whereby the joints are staggered to make a stronger and impervious insulation.

In accomplishing these and other objects of the invention, as hereinafter pointed out, I have provided improved details of structure, the preferred forms of which are illustrated in the accompanying drawings, wherein:

Fig. 1 is a fragmentary perspective view of a pipe insulated in accordance with the present invention, the various layers forming the insulating structure being broken away in stepped-back relation to better illustrate the construction.

Fig. 2 is a cross-section through the pipe and insulation.

Fig. 3 is a longitudinal section showing the longitudinal joints in the insulation.

Fig. 4 is a detail perspective view of a lateral bend of the pipe formed by a screw-fitting and showing my improved insulation applied thereon, the insulation at the bend being broken away and in section.

Fig. 5 is a sectional view through the bend.

Fig. 6 is a cross-section on the line 6—6 of Fig. 5.

Fig. 7 is a perspective view of pipes connected by a T insulated in accordance with the present invention.

Fig. 8 is a longitudinal section through the T connection, the pipes and T being shown in plan.

Fig. 9 is a perspective view of my improved insulation applied to an L fitting having flange connections with the pipe.

Referring more in detail to the drawings:

While my invention is adapted for insulating ducts, piping, tanks, various vessels, and similar containers, as well as wall, roof, ceiling and floor areas, I have particularly illustrated the invention as applied to piping including the fittings thereof.

1 designates a run of cylindrical pipe which is adapted to carry a low temperature medium and on which moisture would normally condense and form a frost or ice coating. However, as above pointed out, it is the purpose of the present invention to insulate the pipe to hold the internal temperatures and prevent accumulation of normally precipitated or attracted moisture on the surface of the pipe.

In carrying out my invention, the surface 2 of the pipe is cleaned of dirt, scale and other accumulations and a prime coating 3 is applied thereover, the coating being a moisture-resistant material which may be applied in the form of a paint or a heated liquid material to receive thereover a layer of insulating material 4, preferably of water-proof character, for example fibered silica such as glass wool, fiber glass, rock wool, mineral wool, slag wool, chrysotiles, crocidolites, amosites, vermiculites, and the like.

In order to facilitate application of the insulation, it preferably consists of preformed rigid or semi-rigid sections 5 and 6, shaped to the contour of the area to be insulated so that they fit closely thereagainst. In the illustrated instance the sections are semicylindrical and of convenient length to permit ready application to a pipe, the inner arcuate faces thereof being sized to intimately engage the coating 3. The sections have material thickness and the side edges have faces 7 and 8 shaped to form close joints 9 when the sections encircle the pipe. After the first sections are applied on the pipe they are retained thereon by strands, such as string or wire 10, having the ends twisted or tied together as at 11. The sections may be secured by metal bands, tension-sealed in place. When the sections are formed of certain materials the component fibers thereof are preferably treated with a binder or filler such as a synthetic resin, mineral oil, bituminous emulsion, bentonitic clays, diatomaceous earth, silicate or oxy-chloride cements, or the like singly or in combination, in order that the sections will retain their desired shape and maintain the cellular structure when additional layers are applied thereover. After application of the first layer, the exterior surface thereof is covered with an impervious seal consisting of one or more layers of sealing material such as bitumen, synthetic resins, rubber cements, fibered mastics, oxidizing oils, resinous emulsions, waxes, latex, and similar water-resistant coating materials, or the impervious sealing means may consist of waxed papers, saturated felts, rubber or synthetic rubber, impregnated cloths, cellulose or plastic sheets, which may be used alone or in combination with the coating materials above noted.

In the illustrated instance the impervious seal 12 comprises two layers of sheet material 13 and 14, the inner layer of which is wrapped about the applied layer of insulating material and is of sufficient width so that the marginal edges 15 and 16 overlap, in staggered relation with respect to the longitudinal joints 9 of the first insulating layer. The outer sheet 14 is wrapped about the layer 13 with the marginal edges 13 thereof overlapped, as at 17, in staggered relation with the lap edges 15 and 16. When the sealing sheets are formed of tacky materials they have sufficient adhesiveness to adhere to the exterior surface of the insulation and to each other, however, when dry coverings are used, it is desirable to use them with one of the fluid or plastic materials above noted. The sheet layers are, therefore, substantially hermetically sealed to each other and to the exterior fiber of the insulating layer so as to seal the cellular structure thereof against infiltration of precipitated or attracted moisture and air. After application of the sealing layers, another layer 18 of insulating material may be applied thereover, which is in the form of semicylindrical sections 19 and 20 formed in the same manner as the insulating sections previously described, but of a larger, inner diameter to engage over the layers forming the seal 12. After application, the second layers of insulating material are retained by strands 21, similar to the strands 10 previously described. After application of the second layer of insulating material, the surface thereof is covered with an impervious seal 22, similar to the seal 12 previously described.

The insulation may be built up to the desired thickness with each layer of insulating material separated by one or more layers of sealing material. After the last layer of insulating material is applied and covered by the impervious sealing layers, the whole is wrapped with a continuous twine, or like wrapping 23. An outer covering 24 is then applied consisting of a heavy board paper jacket 25 followed by a canvas, metal, roll roofing material or plastic finish 26, the exterior surface of which may be protected with a paint seal, indicated at 27.

If the runs of pipe are longer than the sections of insulating material to be applied, the ends of the sections are stepped back relatively to each other so that the circumferential joints are staggered. With the insulation thus applied, it is apparent that the joints are fully broken, both as to circumferential and longitudinal directions, and that the layers of insulation are efficiently sealed against infiltration of natural or precipitated moisture or air.

When the insulation is applied to a screw type fitting, for example, an ell fitting 28 connecting lateral runs of pipe 29 and 30, the first section 31 and 32 on the respective pipes have their ends abutting squarely against the ends 33 of the ell fitting, as shown in Figs. 4 and 5, and the succeeding layers of sealing material 34 and 35 are extended to the ends of the insulating sections. The succeeding layers 36 and 37 of insulating material are stepped back from the end of the first layer, as shown at 38 and 39, followed by corresponding stepbacks of layers to be applied, with the sealing material extending to the ends of the insulating layers so as to cooperate with sealing washers 40 which are sleeved thereagainst, as best shown in Fig. 5. The ell fitting is then covered with a reasonably flexible fibered silica wrapping 41, which overlaps the exposed ends of the first layers of pipe insulation. The material 41 is then bound with twine 42 and covered with an impervious sealing material 43 of the type previously described. Another layer of insulating material 44 is bound around the first in covering relation with the exposed ends of the next layer of insulating material which covers the pipe and this layer is also covered with the impervious sealing material 43. Additional layers are applied in like manner until the insulation is of the required thickness.

When the insulation is applied to flanged fittings, as shown in Figs. 7 to 9 inclusive, the respective layers of insulating material are applied on the runs 45, 46 and 47 of the pipes, as previously described, to a depth corresponding to the diameter of the flanges 48 of the fitting 49. The entire fitting is then covered with layers of insulating material of the character described, including the exposed ends of the step-back insulation layers on the runs of pipe, as clearly shown in Fig. 8. These layers are of segmental form and have their side edges closely fitted and overlapping the stepped portions of the insulating layers, one or more layers of sealing material being interposed between each segment.

While I have particularly illustrated my invention as applied to piping, it is obvious that it may be applied to the cylindrical surfaces of tanks and other vessels in a similar manner without departing from the spirit of the invention. It is also possible to use the insulation for covering various other surfaces, as above pointed out.

From the foregoing it is obvious that I have provided a highly efficient insulating structure formed of cellular material wherein the cells are sealed against infiltration of moisture or moisture containing air. The insulation, when built up as described, is of strong, rigid construction, and has a smoothly continuous exterior to enhance the appearance thereof.

What I claim and desire to secure by Letters Patent is:

1. A structure of the character described including a base element having an exterior surface normally tending to condense moisture, a moisture resistant coating on said surface and having an adhesive property, a layer of preformed fibrous sections of siliceous material having adjacent edges closely contacting each other and having an inner surface conforming to the surface of the base element for intimately contacting the fibers at said inner surface with said adhesive coating whereby said coating seals said inner surface of said sections, said sections providing a substantially uniform fibrous mass of material thickness on said base element, a second layer of similarly formed sections having contacting edges staggered with respect to the sections forming the first layer, an impervious sealing material also of adhesive property interposed between said layers and sealed to the fibers of the respective layers, and an impervious cover on the outer of said layers, said cover and impervious sealing material cooperating with the coating to exclude moisture from entrance into said fibrous layers.

2. A structure of the character described including a base element having an exterior surface normally tending to condense moisture, a moisture resistant coating having adhesive properties on said surface, a layer of preformed fibrous sections of siliceous material having adjacent edges closely contacting each other and having an inner surface conforming to the surface of the base element for intimately contacting said coating and causing adherence of the fibers of said inner surface to the adhesive coating, said sections providing a substantially uniform fibrous mass of material thickness on said base element, a second layer of similarly formed sections having contacting edges staggered with respect to the sections forming the first layer, said fibers making up said sections being secured together by a binding material for maintaining shape of the sections, an impervious sealing material having adhesive properties interposed between said layers and sealed to the fibers of the respective layers, and an impervious cover on the outer of said layers, said cover and impervious sealing material cooperating with the coating to exclude moisture from entering into the fibrous layers.

3. A structure of the character described including a base element having an exterior surface normally tending to condense moisture, a moisture resistant coating having adhesive properties on said surface, a layer of preformed fibrous sections of moisture resistant siliceous material having adjacent edges closely contacting each other and having an inner surface conforming to the surface of the base element for intimately contacting said coating causing adherence of the fibers of said inner surface to the adhesive coating, said sections providing a substantially uniform fibrous mass of material thickness on said base element, a second layer of similarly formed sections having contacting edges staggered with respect to the sections forming the first layer, an impervious sealing material having adhesive surfaces interposed between each layer to seal with the fibers of the respective layers, and an impervious cover on the outer of said layers.

4. A structure of the character described including a pipe, a moisture resistant coating on the surface of said pipe and having an adhesive property, a layer of fibrous siliceous material having an inner surface conforming to the surface of the pipe for intimately contacting the fibers of said inner surface to cause adherence with said coating and for sealing said inner surface, said fibrous siliceous material providing a substantially uniform mass of material thickness on said pipe, a layer of sealing material having a tacky characteristic and wrapped about said sections in sealing contact with the outer fibers of said sections and having overlapping marginal edges, a second layer of fibrous siliceous material having contacting side edges and inner surfaces in intimate contact with the layer of tacky sealing material to seal said fibers, and an impervious cover on the outer of said sections to exclude moisture from entrance into the sections.

5. A structure of the character described including a pipe, a moisture resistant coating on the surface of said pipe and having an adhesive property, a layer of fibrous siliceous material having an inner surface conforming to the surface of the pipe for intimately contacting said coating to cause adherence of the fibers to said coating for sealing said inner surface, said fibrous siliceous material providing a substantially uniform mass of material thickness on said pipe, a layer of sealing material having a tacky characteristic and wrapped about said sections in sealing contact with the outer fibers of said sections and having overlapping marginal edges, a second layer of similar material having inner surfaces in intimate contact with the layer of tacky sealing material to adhere said fibers to the sealing material, a layer of sealing material having tacky characteristic covering the outer sections, and an impervious cover covering said last named layer of sealing material.

WILLARD D. RYDER.